United States Patent [19]

Albrecht

[11] Patent Number: 4,465,897

[45] Date of Patent: Aug. 14, 1984

[54] THREE-SERVICE WIRE DISTRIBUTING UNIT AND OUTLET MEANS THEREFOR

[75] Inventor: Raymond E. Albrecht, Sewickley, Pa.

[73] Assignee: H. H. Robertson Company, Pittsburgh, Pa.

[21] Appl. No.: 376,913

[22] Filed: May 10, 1982

[51] Int. Cl.³ .............................................. H02G 3/26
[52] U.S. Cl. ......................................... 174/48; 52/221
[58] Field of Search ................... 174/48, 49, 53, 66, 174/67, 95–98; 52/221

[56] References Cited

U.S. PATENT DOCUMENTS

| | | | |
|---|---|---|---|
| 1,920,811 | 8/1933 | Schwabacher | 174/53 |
| 1,979,804 | 11/1934 | Lutz | 174/95 X |
| 3,459,875 | 8/1969 | Fork | 174/97 |
| 3,592,956 | 7/1971 | Fork | 174/49 |
| 3,751,576 | 8/1973 | Klinkman et al. | 174/48 |
| 3,886,702 | 6/1975 | Fork | 174/49 X |
| 4,096,347 | 6/1978 | Penczak | 174/48 |
| 4,178,469 | 12/1979 | Fork | 174/48 |
| 4,338,484 | 7/1982 | Littrell | 52/221 X |

Primary Examiner—J. V. Truhe
Assistant Examiner—D. A. Tone
Attorney, Agent, or Firm—G. E. Manias

[57] ABSTRACT

A metal cellular flooring unit presents at least two enclosed cells separated by a lengthwise trough. A distinct partitioning element substantially coextensive in length with the first cell, divides the first cell into first and second subcells. A set of access openings is provided including distinct crest and web access openings in the crest and one web of the first cell providing access solely to the first and second subcells, respectively; and a web access opening in that web of the second cell opposite to web access opening of the first cell, providing access to the second cell. The flooring unit is thereby adapted for separate distribution of the wiring of three different services, such as, computer or like services, telephone and power. Access to all three services is available at each location along the length of the flooring unit at which a set of access openings is provided.

20 Claims, 29 Drawing Figures

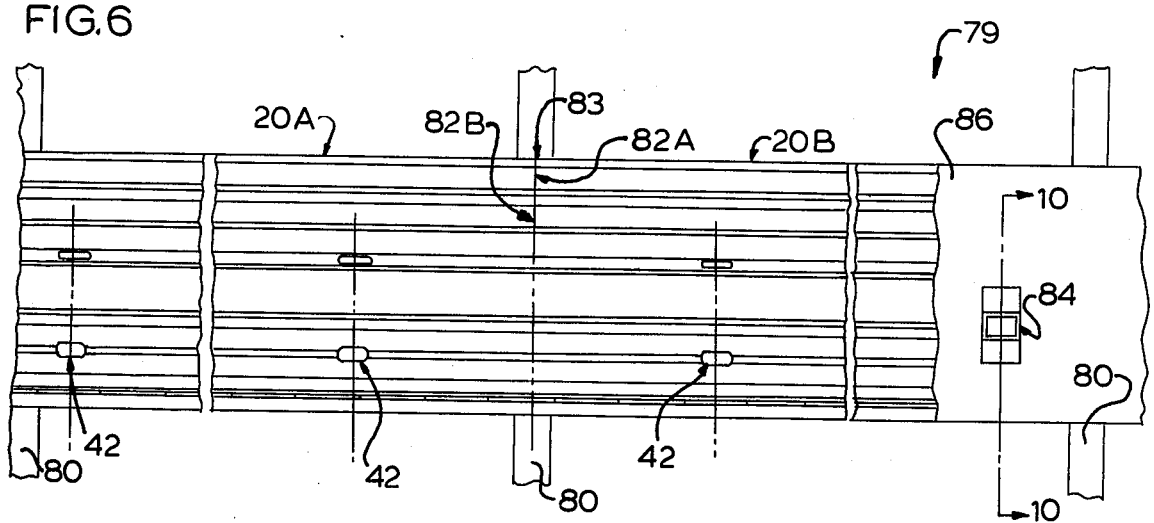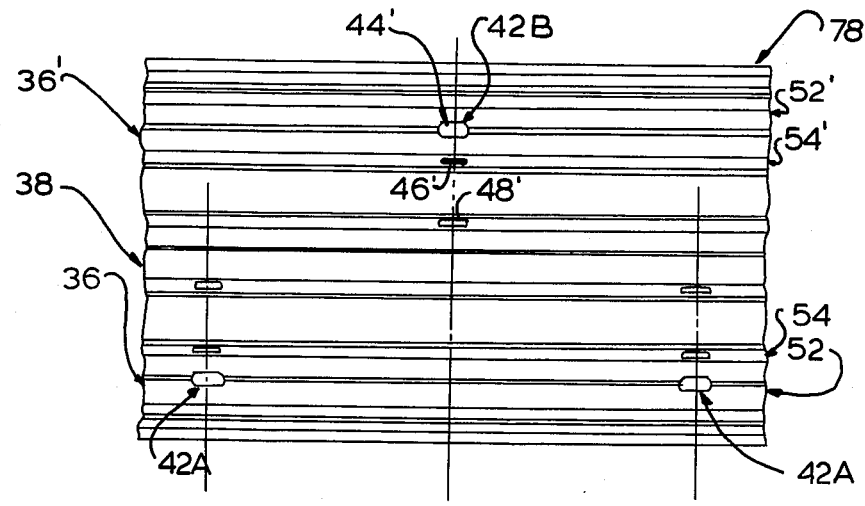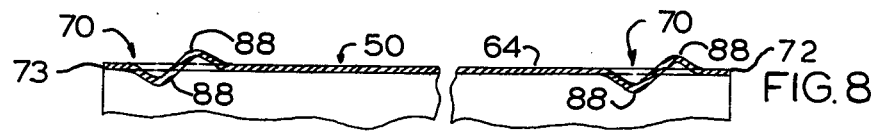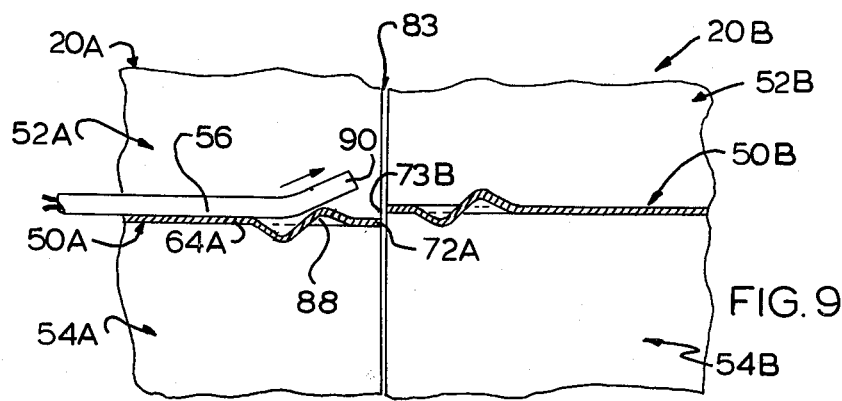

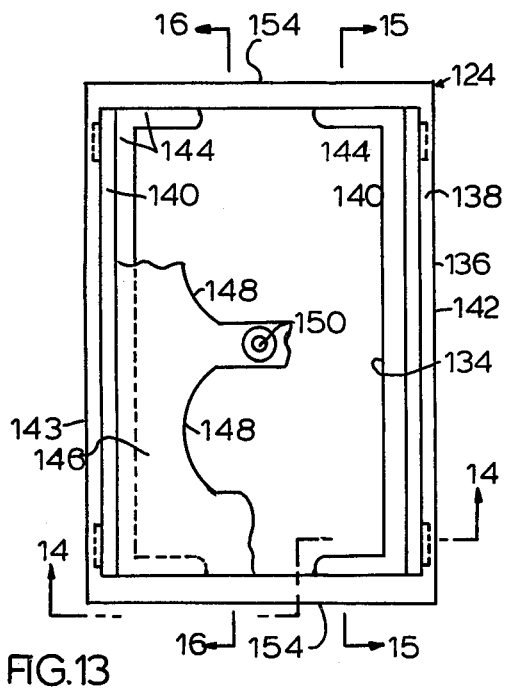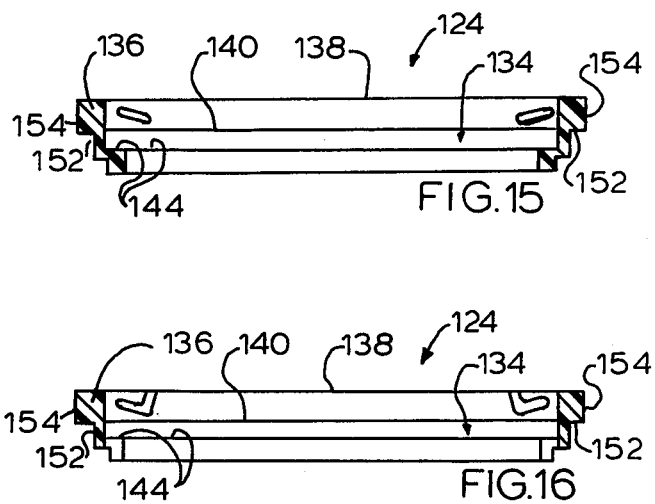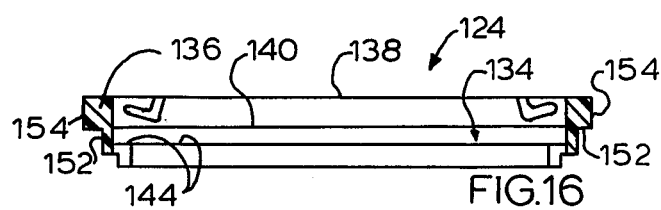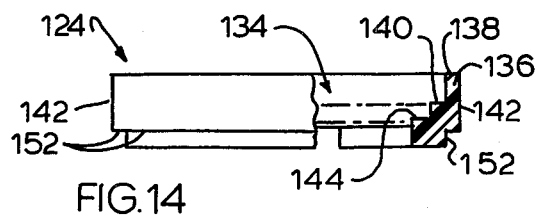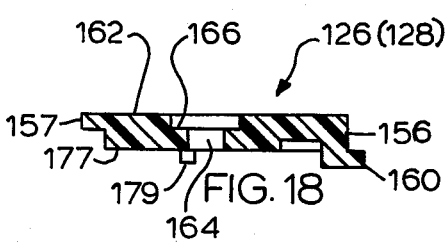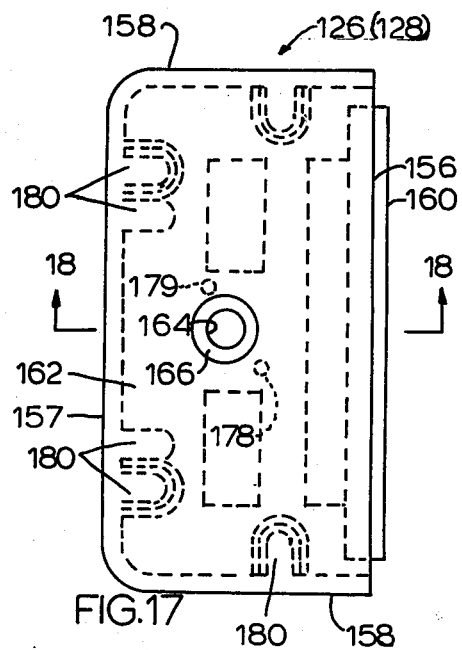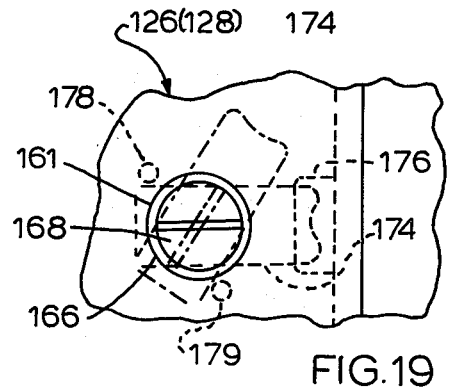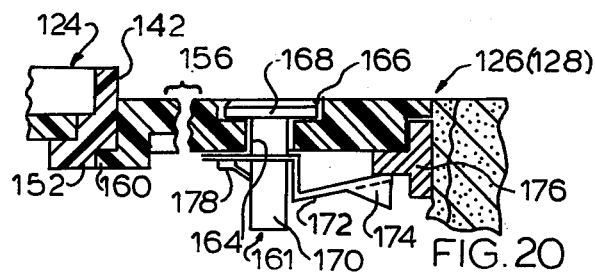

THREE-SERVICE WIRE DISTRIBUTING UNIT AND OUTLET MEANS THEREFOR

BACKGROUND OF THE INVENTION

1. Field of the Invention

This invention relates to an electrical wiring distribution system including metal cellular flooring units adapted to be embedded in concrete and which present alternating troughs and enclosed cells, and more particularly to an improved metal cellular floor unit adapted to convey three different electrical services, such as, power, telephone and CRT services.

2. Description of the Prior Art

Heretofore, distribution systems have distributed the wiring of two different services, that is power and telephone. The ever-increasing use of computers and other terminal-to-terminal communications equipment, necessitates the distribution of three different services, that is power, telephone and a computer or the like services.

Flooring units for distributing the wiring of three different services throughout a building floor are known in the Prior Art. Such a flooring unit is disclosed in U.S. Pat. No. 3,459,875 (FORK) wherein three separate cells of the flooring units, each convey a different electrical service. Different arrangements of conduit means connecting adjacent cells and outlet openings provide access to all three electrical services at a single location in the flooring unit.

Another type of flooring unit is disclosed in U.S. Pat. Nos. 3,592,956 (FORK) and 4,178,469 (FORK) wherein capping means encloses the trough space between adjacent cells to provide an additional unobstructed electrical passageway. An arrangement of access openings and partitions provides access to each of the three services at a single location in the floor. Such metal cellular units provide unique solutions for the three-service distribution in reinforced concrete floor structures. However, these metal cellular units find little utility in metal subfloor/concrete floor structures for two principal reasons. A number of the troughs are unavailable for placement of shear studs with a corresponding reduction in the composite beam strength of the floor. In addition, the capping means maintain the capped troughs in a concrete-free status. Therefore the amount of concrete which would normally be available to serve as a heat sink during a fire is significantly reduced and the fire resistance of the floor structure is likewise reduced.

Another such flooring unit is disclosed in U.S. Pat. No. 3,751,576 (KLINKMAN et al) wherein a relatively wide single cell unit is divided into three separate subcells by partitions integrally formed in the bottom sheet of the unit. A single relatively wide access opening in the crest of the unit provides access to each subcell and to the wiring conveyed therethrough. Such a unit, commonly known as a plural-cell duct, finds utility in reinforced concrete floor structures wherein the unit is not intended to serve as a structural component of the floor structure.

SUMMARY OF THE INVENTION

The principal object of this invention is to provide an improved three-service metal cellular flooring unit adapted to distribute three different services along the length thereof, and to offer access to all three services at each of a plurality of spaced locations therealong.

Another object of this invention is to provide a three-service metal cellular flooring unit wherein the wire-conveying conduits are formed without obstructing the lengthwise troughs thereby retaining the full composite beam and composite slab capacity of the metal cellular flooring unit.

Still another object of this invention is to provide a three-cell metal cellular flooring unit which incorporates at least one partitioning element having opposite ends configured to prevent hang-up of wiring being fished through the cells of one flooring unit into the cells of the next in-line flooring unit.

The present invention provides improvements in a metal cellular flooring unit of the type presenting at least two generally parallel cells separated by a lengthwise trough. At least one set of access openings is provided in adjacent cells including a crest access opening in the crest of a first cell, a first web access opening in that web of the first cell presented in the trough, and a second web access opening provided in that web of a second cell presented in the trough. A distinct partitioning element is disposed within the first cell and is substantially coextensive in length therewith. The partitioning element divides the first cell into a first subcell including the crest access opening and a second subcell including the first web access opening. The overall arrangement is such that computer wiring, power wiring, and telephone wiring may be conveyed separately through the first and second subcells and the second cell, respectively and are thereby maintained segregated one from the other. Access to all three services may be gained at each location in the flooring unit at which a set of the access openings is provided.

When two of the present flooring units are erected end-to-end and cell-to-cell alignment, the end edges of the two partitioning elements may, for one reason or another, be offset from each other. The leading end of a wire being fished through one of the subcells could hang-up on the adjacent offset end edge. The present invention provides means for eliminating the potential hang-up. That is, a set of generally vertical rib-like protrusions is provided adjacent to each end edge of the partitioning elements. The protrusions are positioned to deflect the leading end of the wire being fished, away from the adjacent offset end edge.

BRIEF DESCRIPTION OF THE DRAWINGS

FIG. 6 is a fragmentary broken plan view illustrating two of the flooring units of FIG. 1 spanning across horizontal beams and erected in end-to-end and cell-to-cell alignment;

FIG. 7 is a fragmentary plan view of the flooring unit of FIG. 5;

FIG. 8 is a fragmentary broken cross-sectional view taken along the line 8—8 of FIG. 2;

FIG. 9 is a fragmentary cross-sectional view, similar to FIG. 8, illustrating a region of the end joint between the flooring units of FIG. 6;

FIG. 13 is a plan view of a central closure plate;

FIG. 14 is an end view, partly in cross-section, as seen from the line 14—14 of FIG. 13;

FIGS. 15 and 16 are cross-sectional views taken along the lines 15—15 and 16—16 respectively of FIG. 13;

FIG. 17 is a plan view of a lateral closure plate;

FIG. 18 is a cross-sectional view taken along the line 18—18 of FIG. 17;

FIG. 19 is a fragmentary plan view of cover retention means; and

FIG. 20 is a cross-sectional view taken along the line 20—20 of FIG. 11;

DESCRIPTION OF THE PREFERRED EMBODIMENT(S)

Figure 1:
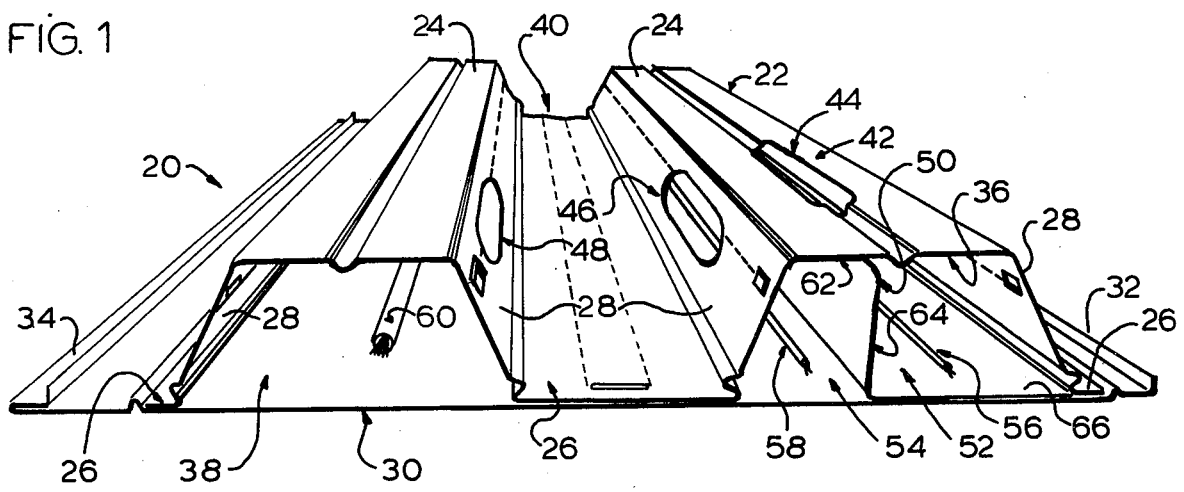
FIG. 1 is a fragmentary isometric view illustrating one embodiment of the present three-service metal cellular flooring unit.

FIG. 1 illustrates a three-service metal cellular flooring unit 20 comprising a corrugated upper metal sheet 22 presenting alternating coplanar crests 24 and coplanar valleys 26 and webs 28 connecting adjacent ones of the crests 24 and valleys 26; and a correlative lower metal sheet 30 secured to the upper metal sheet 22 along contiguous portions thereof. The flooring unit presents stiffened edges 32, 34 along its opposite longitudinal edges adapting the flooring unit 20 for erection in side-by-side overlapped relation with adjacent ones of the flooring units 20 or of single-thickness corrugated decking units. The flooring unit 20 as well as others hereinafter described may comprise those metal cellular flooring units disclosed in U.S. Pat. No. 3,812,636 issued May 28, 1974 and assigned to the assignee of the present invention.

The lower metal sheet 30 cooperates with the corrugated upper metal sheet 22 to provide generally parallel cells 36, 38 which are separated by a lengthwise trough 40. It will be observed in FIG. 1 that the trough 40 comprises one of the valleys 26 and confronting webs 28 which connect the valley 26 to the coplanar crests 24.

A set 42 of access openings is provided including a crest access opening 44 in the crest 24 of the first cell 36 and opposed first and second web access openings 46, 48 provided in the web 28 of the first cell 36 and of the second cell 38, respectively.

A distinct partitioning element 50 resides within the first cell 36 and is substantially coextensive in length therewith. The partitioning element 50 divides the first cell 36 into a first subcell 52 including the crest access opening 44 and a second subcell 54 including the first web access opening 46. The overall arrangement is such that the flooring unit 20 is adapted to distribute the wiring of three different services. For example, computer wiring 56 may be distributed through the first subcell 52 and is accessible through the crest access opening 44. Power wiring 58 may be distributed through the second subcell 54 and is accessible through the first web access opening 46. Telephone wiring 60 may be distributed through the second cell 38 and is accessible through the second web access opening 48.

Figure 2:
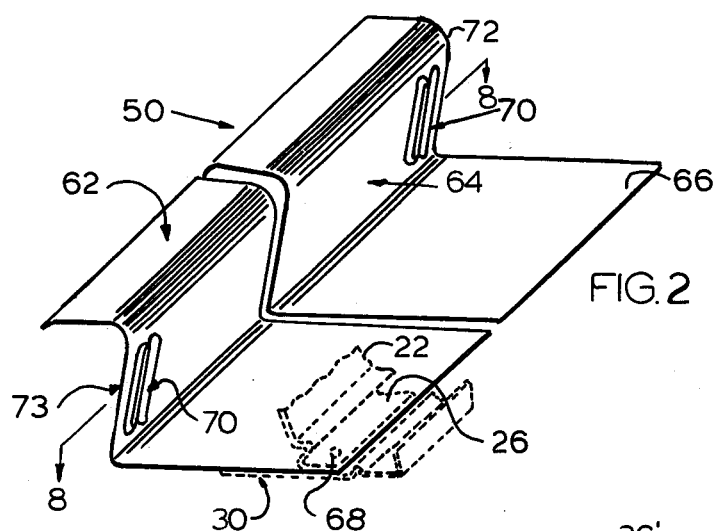
FIG. 2 is a broken isometric view of a distinct partitioning element employed in the flooring unit of FIG. 1.

The distinct partitioning element 50 (FIG. 2) preferably comprises a profiled metal sheet including a top flange 62, a central portion 64 depending from the top flange 62, and a bottom flange 66 extending laterally away from the central portion 64 in a direction opposite to that of the top flange 62. As best shown in FIG. 1, the top flange 62 is disposed adjacent to the crest 24 of the first cell 36 and resides between the crest access opening 44 and the lengthwise trough 40. The central portion 64 extends downwardly from the top flange 62 toward the lower metal sheet 30. The bottom flange 66 (FIG. 2) extends between a valley 26 and the lower metal sheet 30. In the preferred arrangement, securing means such as spot welds 68, secure the bottom flange 66 to the valley 26 and to the lower metal sheet 30.

Sets 70 of rib-like protrusions are provided in the central portion 64, one adjacent to each of the opposite end edges 72, 73 of the partitioning element 50. As will be described, the protrusions 70 serve to deflect wires being fished through the cell of one flooring unit into the corresponding cell of the next adjacent flooring unit and thereby prevent the wires from hanging-up on the end edge of the partitioning element of the next adjacent flooring unit.

Figure 3:
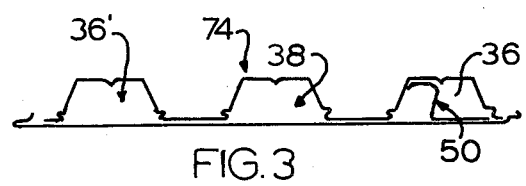
FIGS. 3, 4 and 5 are schematic end views of metal cellular decking illustrating alternative arrangements of the partitioning element.
Figure 4:
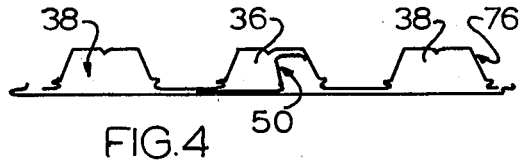
Figure 5:
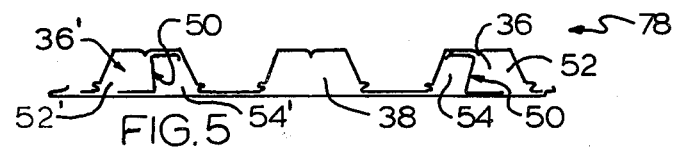

FIG. 1 illustrates the metal cellular flooring unit 20 presenting two adjacent cells 36, 38. The set 42 of access openings and the partitioning element 50 are equally useful in flooring units presenting more than two cells. For example, FIG. 3 illustrates a flooring unit 74 presenting a central or second cell 38, and two lateral or first cells 36, one on each side of the central or second cell 38. One of the first cells 36 is subdivided by the distinct partitioning element 50. FIG. 4 illustrates a flooring unit 76 presenting a central or first cell 36 provided with the distinct partitioning element 50, and lateral or second cells 38, one on each side of the central or first cell 36. FIG. 5 illustrates a flooring unit 78 having a central or second cell 38, and lateral or first cells 36, one on each side of the central or second cell 38, the lateral cells 36, 36' are each subdivided by a distinct partitioning element 50 to provide first and third subcells 52, 52', and second and fourth subcells 54, 54'.

FIG. 6 illustrates a portion of a floor structure 79 wherein two of the flooring units 20A, 20B span across horizontal beams 80 of the structural framework. The flooring units 20A, 20B are erected in end-to-end relation, that is with the ends 82A, 82B thereof adjacent to each other to form an end joint 83; and in cell-to-cell registration. Each of the flooring units 20A, 20B present a plurality of the sets 42 of access openings preferably provided at uniformly spaced locations along the length thereof. The arrangement provides individual locations at which access to the three services may be gained, for example, through outlet means 84 and the associated passageways (not visible) extending through the overlying layer of concrete 86.

FIG. 7 illustrates a fragmentary plan view of the three-cell flooring unit 78. The flooring unit 78 presents first sets 42A of the access openings presented at uniformly spaced locations along the first and second cells 36, 38. The flooring unit 78 also is provided with second sets 42B (only one set illustrated) of the access openings at uniformly spaced locations along the first and second cells 36', 38. The second set 42B includes a second crest access opening 44', a third web access opening 46' and a fourth web access opening 48' providing access, respectively, to the third and fourth subcells 52', 54' and the second cell 38. Each second set 42B of access openings is offset from the first sets 42A longitudinally along the flooring unit 78 and resides centrally between adjacent ones of the sets 42A. The flooring unit 78 is capable of providing the same density of outlet means 84 (FIG. 6) as the flooring unit 20 but at staggered locations in the floor structure.

Referring to FIG. 8, each set 70 of rib-like protrusions preferably comprises corrugations 88 formed integrally in the central portion 64 immediately adjacent the opposite end edges 72, 73 of the central portion 64. In addition, the corrugations 88 extend outwardly from both of the opposite faces of the central portion 64.

FIG. 9 illustrates a fragment of the joint 83 formed between the flooring units 20A, 20B of FIG. 6. During the manufacture of the flooring units 20, the partitioning element 50 may, for one reason or another, be offset from the desired location. As can be seen in FIG. 9, the partitioning element 50A is not aligned with the partitioning element 50B. Therefore the end edges 72A, 73B thereof are misaligned. When wiring, such as the computer wiring 56 is fished through the first subcell 52A the leading end 90 thereof may, in the absence of the corrugations 88, engage or hang-up on the end edge 73B of the partition element 50B of the next adjacent flooring unit 20B. However, as illustrated in FIG. 9, the wiring end 90 engages the corrugation 88 and is deflected thereby away from the end edge 73B. Therefore wiring may be fished in either direction in the first and second subcells 52, 54, respectively, without fear of the wiring hanging-up on a projecting end of either of the partitioning elements 50.

Figure 10:
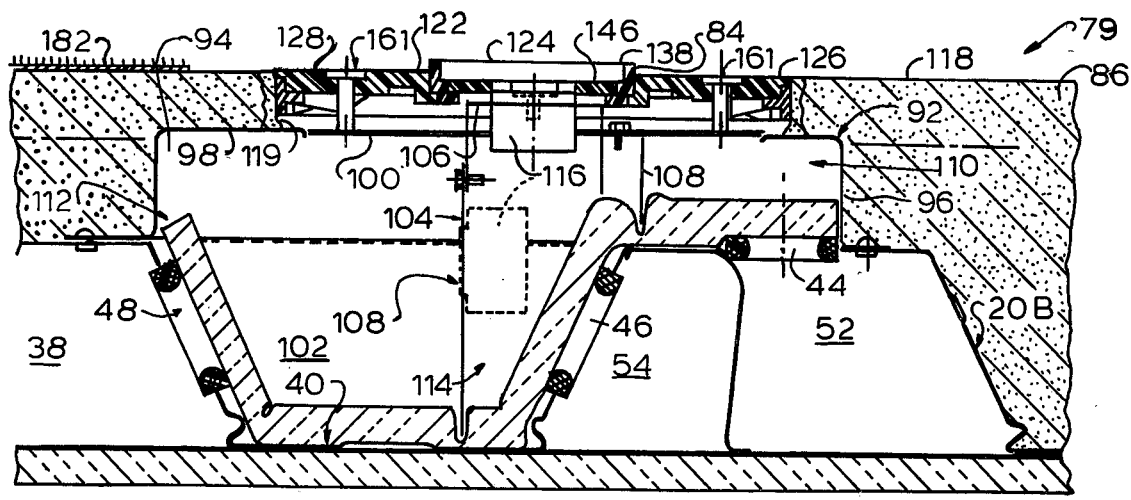
FIG. 10 is a cross-sectional view taken along the line 10—10 of FIG. 6.

Referring to FIG. 10, housing means 92 is provided in overlying relation with the flooring unit 20B and provides a chamber designated generally by the numeral 94 which encloses the crest access opening 44 and a portion of the lengthwise trough 40 which includes the first and second web access openings 46, 48. The housing means 92 includes an inverted cup-shaped housing 96 having an upper wall 98 provided with a single outlet opening 100, and trough closures 102 (only one visible in FIG. 10) depending into the lengthwise trough 40. An inverted generally U-shaped member 104 extending transversely of the housing 96 and the trough closures 102, includes a top wall 106 at least at the level of the upper wall 98 of the housing 96, and opposite sidewalls 108 depending from opposite sides of the top wall 106 toward the flooring unit 20B. The U-shaped member 104 divides the chamber 94 into a first compartment 110 including the crest access opening 44, a second compartment 112 including the second web access opening 48, and a central compartment 114 including the first web access opening 46.

Figure 12:
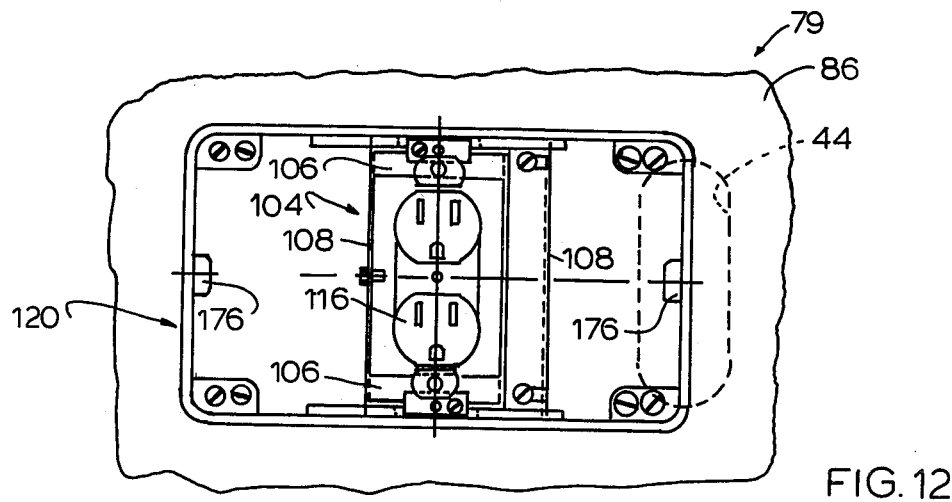
FIG. 12 is a fragmentary plan view similar to FIG. 11 with closure plates removed to show details.

Referring to FIGS. 10 and 12, the top wall 106 is adapted to support an electrical duplex receptacle 116 at a level adjacent to the upper surface 118 of the floor structure 79. A second of the duplex receptacles 116 may be supported on the inner sidewall 108 as shown in FIG. 10.

Figure 11:
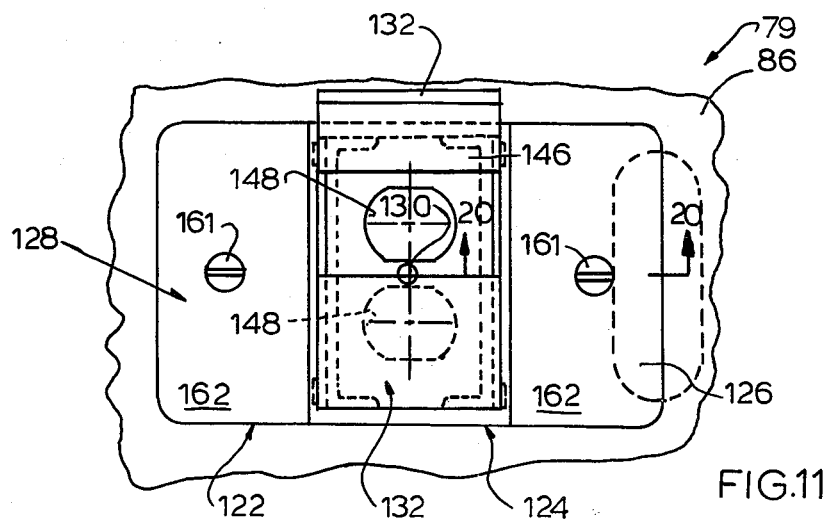
FIG. 11 is a fragmentary plan view of closure means illustrated in FIG. 10.

FIGS. 10 through 12 illustrate the housing means 92 in an activated state. That is, after the concrete above the housing means 92 has been removed to provide a concrete passageway 119 and the outlet means 84 has been installed. The outlet means 84 includes a finishing ring 120 secured to the housing means 92, and closure means 122 fitted within and secured to the finishing ring 120. The closure means 122 may comprise a three-piece unit including a central closure plate 124 and lateral closure plates 126, 128. The central closure plate 124 is retained in position relative to the finishing ring 120 by a single fastener 130 (FIG. 11) threaded into the receptacle 116. Covers 132 (FIG. 11) are individually pivotally and removably connected to the central closure plate 124. When closed, the covers 132 protect the receptacle 116 from ingress of fluids and inadvertent entry of short-producing debris. Each cover 132 may be opened or removed entirely when necessary, to provide access to the subjacent plug.

The central closure plate 124 (FIGS. 13-16) has a generally rectangular shape including a central opening 134 surrounded by a perimeter bead 136 presenting a bead upper surface 138. Lateral first shoulders 140, one adjacent to eaach of the opposite sides 142, provide support for the covers 132 (FIG. 11). Discontinuous second shoulders 144 disposed below the level of the first shoulders 140 provide support for a face plate 146 a fragment of which is illustrated in FIG. 13. The face plate 146 (FIGS. 11, 13) presents openings 148 providing access to the outlets of the receptacle 116; and a single central aperture 150 for receiving the fastener 130 (FIG. 11). The fastener 130 secures the face plate 146 to the electrical receptacle 116 thereby retaining the central closure plate 124 in fixed position relative to the finishing ring 120 (FIG. 12).

Reverting to FIGS. 14-16, a perimeter recess 152 is provided below the bead 136, which extends along the opposite sides 142 and along the opposite ends 154.

Referring to FIGS. 17, 18, the lateral closure plates 126 (128) are identical in configuration. Each of the plates 126 (128) includes opposite sides 156, 157, and opposite ends 158. A flange 160 extends outwardly from the side 156. As shown in FIG. 20, the central and lateral closure plates 124, 126 present confronting sides, that is the sides 142 and 156. The flange 160 of the lateral closure plate 126 (128) is engaged in the recess 152 of the closure plate 124 thereby precluding upward movement of the lateral closure plate 126 (128) relative to the central closure plate 124.

Referring to FIGS. 10 and 11, each of the lateral closure plates 126, 128 is provided with releasable fastener means 161 operable from the upper surface 162 of each plate, for releasably securing each closure plate 126, 128 to the finishing ring 120 (FIG. 12). Reverting to FIGS. 17, 18, each of the lateral closure plates 126 (128) is provided with a clearance aperture 164 adjacent the side 157. A recessed area 166 provided in the upper surface 162, surrounds the aperture 164. Referring to FIGS. 19 and 20, the releasable fastener means 161 comprises a slotted head 168 disposed within the recessed area 166 and substantially flush with the upper surface 162. A stem 170 depends from the slotted head 168 downwardly through the clearance opening 164. Clip means 172 carried by and rotatable with the stem 170, includes a wing 174 positioned to be resiliently engaged beneath a flange segment 176. As can be seen in FIG. 12, the finishing ring 120 presents opposed support flanges 176, one at each of its opposite ends. Referring to FIG. 19, the slotted head 168 may be rotated by any suitable tool such that the wing 174 shown in dash-dot outline is rotated out from under the support flange 176 thereby releasing the lateral closure plate 126 or 128 for removal. The lateral closure plate 126 (128) is provided with posts 178, 179 which project downwardly from the lower face 177 (FIG. 18) thereof. The posts 178, 179 are positioned to limit rotation of the clip means 174 to the extreme positions illustrated in FIG. 19.

As is conventional, each of the lateral closures 126 (128) is provided with a plurality of weakened areas 180 along the perimeter thereof, which may be cut away to allow egress of wiring from the subjacent compartments 110, 112 (FIG. 10).

The closure means 84 (FIG. 10) is useful in those installations wherein it is desired to have the electrical receptacle 116 presented substantially flush with the upper surface 118 and visible in an opening in a decorative covering such as carpeting 182. The closure means 84 also allows rapid access to each of the compartments 110, 112 by removing the appropriate one of the lateral closure plates 126, 128.

An alternative outlet arrangement is illustrated in FIGS. 21–29, inclusive. Corresponding numerals will be employed to identify corresponding parts heretofore described.

Figure 21:
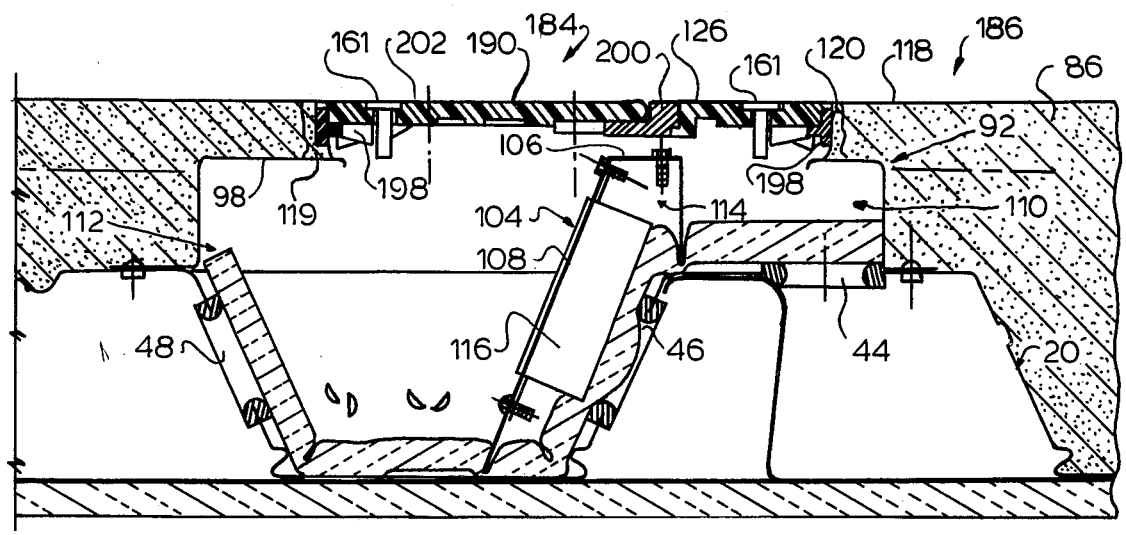
FIG. 21 is a cross-sectional view, similar to FIG. 10, illustrating an alternative arrangement.
Figure 23:
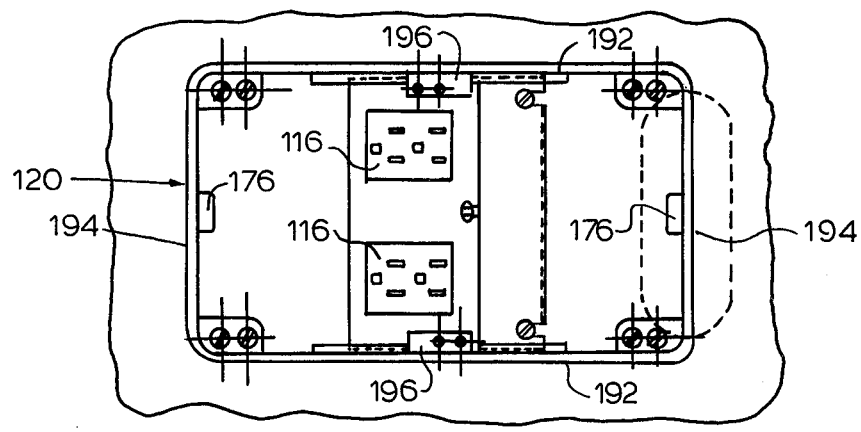
FIG. 23 is a fragmentary plan view, similar to FIG. 11, wherein closure plates are removed to show details.

FIG. 21 illustrates a floor structure 186 incorporating the flooring unit 20 and cooperating therewith, the housing means 92 and the inverted U-shaped member 104 providing the first, second and central compartments 110, 112, 114. In this arrangement, the sidewall 108 of the member 104 supports two receptacles 116 which, as best shown in FIG. 23, are housed within and accessible from the second compartment 112. The top wall 106 of the member 104 resides at least at the level of the upper wall 98 of the housing means 92. Outlet means 184, supported within the concrete passageway 119 substantially flush with the upper surface 118 of the concrete 86, provides ready access to the first and second compartments 110, 112. The outlet means 184 includes a three-piece closure member 190 supported on the finishing ring 120.

The finishing ring 120 (FIG. 23) has a generally rectangular configuration including opposite sides 192, opposite ends 194, opposed first support flanges 196 presented on opposed interior edges and centrally of the sides 192, and the opposed second support flanges 176 presented on opposed interior edges and centrally of the ends 194.

Figure 22:
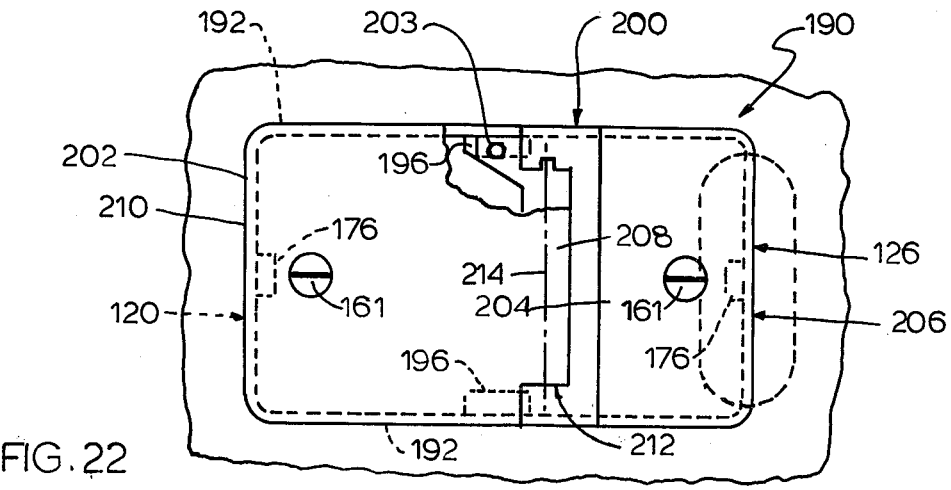
FIG. 22 is a fragmentary plan view of closure means illustrated in FIG. 21.

The closure member 190 (FIGS. 21, 22) includes a central closure plate 200, one of the heretofore described lateral closure plates 126 as a first lateral closure plate 126, and a second lateral closure plate 202. Each of the closure plates 126, 202 is provided with one of the heretofore described releasable fastener means 161. As best seen in FIG. 22, the central closure plate 200 spans across the opposite sides 192 of the finishing ring 120 and is secured to the first support flanges 196 by positive fasteners 203 (only one visible). The first lateral closure plate 126 has opposite first and second plate sides 204, 206. The first lateral closure plate 126 is installed such that the first plate side 204 thereof underlaps the central closure 200 and such that the second plate side 206 overlies one of the second support flanges 176 and is secured thereto by the releasable fastener means 161. The second closure plate 202 has opposite first and second plate sides 208, 210. The second lateral closure plate 202 is arranged such that the first plate side 208 thereof overlaps central closure plate 200 and such that the second plate side 210 overlies the other second support flange 176 and is secured thereto by the releasable fastener means 161. Pivot means 212 (not visible in FIG. 22) is provided for pivotally connecting the first plate side 208 of the second lateral closure plate 202 to the central closure plate for pivotal movement about an axis 214 extending transversely of the opposite sides 192 of the finishing ring 120. The arrangement is such that when the releasable fastener means 161 is released, the second lateral closure plate 202 may be lifted in lidlike fashion to gain access to the subjacent compartment 112.

Figure 24:
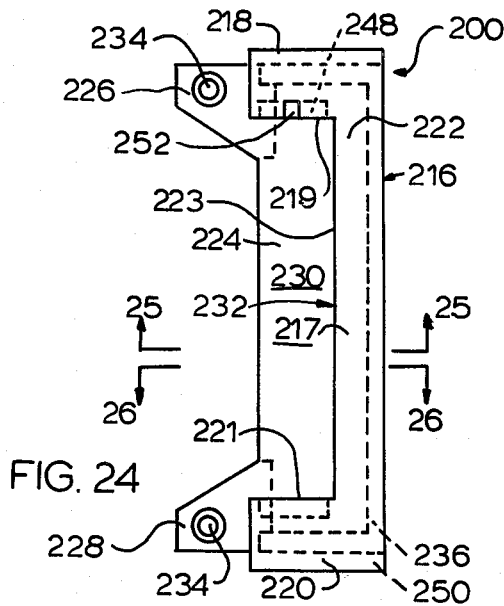
FIG. 24 is a plan view of a central closure plate.
Figure 25:
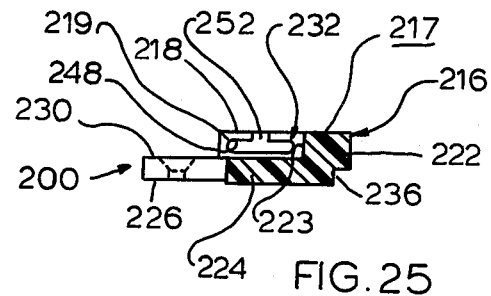
FIGS. 25 and 26 are cross-sectional views taken along the lines 25—25 and 26—26, respectively, of FIG. 24.
Figure 26:
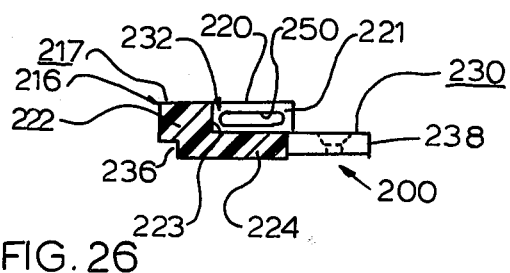

Referring to FIGS. 24–26, the central closure plate 200 comprises a generally channel-shaped upper portion 216 presenting an upper face 217. The upper portion 216 includes opposite end portions 218, 220 and a connecting portion 222. The end portions 218, 220 and the connecting portion 222 present contiguous interior faces 219, 221, 223, respectively. The central closure plate 200 additionally includes a ledge 224 which is contiguous with the upper portion 222 and has ledge extensions 226, 228 which are contiguous with the end portions 218, 220. The ledge 224 and ledge extensions 226, 228 have a common upper surface 230 which is below the level of the upper face 217 of the upper portion 222. A pocket 232 is formed by the ledge 224 and the contiguous interior faces 219, 221, 223 of the upper portion 222. Fastener-receiving apertures 234 are provided, one in each of the ledge extensions 226, 228. As best seen in FIGS. 25 and 26, a recess 236 is provided along that edge of the connecting portion 222 opposite the ledge 224.

As heretofore indicated, the first lateral closure plate is identical to the lateral closure plate 126 described above in connection with FIGS. 17 and 18.

Figure 27:
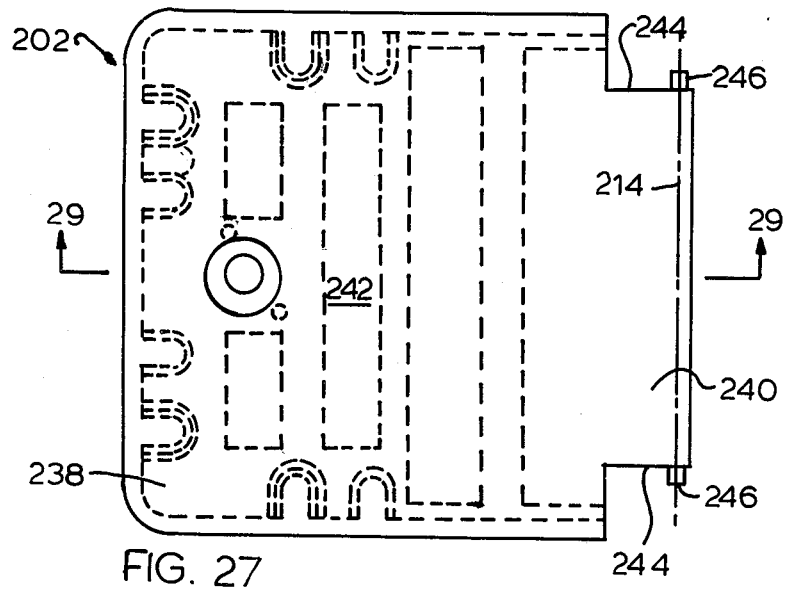
FIG. 27 is a plan view of a lateral closure plate.
Figure 28:
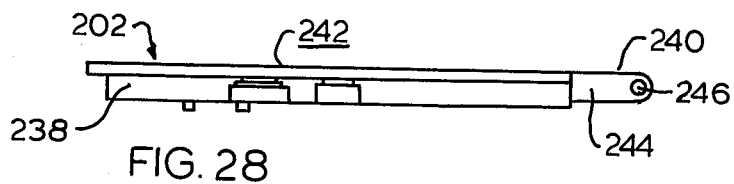
FIG. 28 is a side view of the lateral closure plate of FIG. 27.
Figure 29:
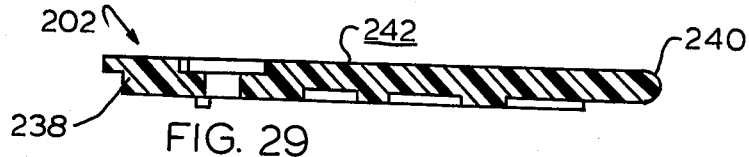
FIG. 29 is a cross-sectional view taken along the line 29—29 of FIG. 27.

Referring to FIGS. 27 through 29, the second lateral closure plate 202 presents a main body portion 238 and a tongue 240 presenting a common upper face 242. The tongue 240 presents opposite end faces 244 and pins 246, one projecting from each of the end faces 244 and being axially aligned along the pivot axis 214. The pins 246 are received in grooves 248, 250 (FIGS. 24–26) presented in the interior faces 219, 221 of the end portions 218, 220. The groove 248 is provided with an exit slot 252 which permits the associated pin 246 to be removed from the groove 248 thereby allowing the second closure plate 202 to be removed.

It will be observed in FIG. 22 that the first, second and central closure plates 126, 202 and 200, when assembled, present an aesthetically pleasing generally rectangular configuration. Either of the first and second lateral closure plates 126, 202 may be removed by releasing the releasable fastener 161 thereby gaining rapid access to the subjacent compartments 110, 112 (FIG. 21).

It should be readily apparent from the foregoing description that the present invention provides an improved three-service wire distributing unit adapted to distribute three different electrical services along the length thereof, and to offer convenient access by means of improved outlet means, to all three services at each of a plurality of spaced locations therealong.

I claim:

1. An electrical wiring distributing metal cellular flooring unit comprising:
   a corrugated upper metal sheet presenting alternating coplanar crests and coplanar valleys and webs connecting adjacent ones of said crests and said valleys, and a correlative lower metal sheet secured to said upper metal sheet along contiguous portions thereof, said flooring unit presenting generally parallel cells separated by a lengthwise trough, said trough comprising a valley and confronting webs connecting said valley to said coplanar crests;

a set of access openings in adjacent cells including a crest access opening in the crest of a first cell, and opposed first and second web access openings in the confronting webs of said first cell and a second cell respectively;

a distinct partitioning element substantially coextensive in length with said first cell, dividing said first cell into a first subcell including said crest access opening and a second subcell including the first web access opening, said partitioning element comprises a profiled metal sheet including a portion extending from the crest of said first cell downwardly toward said lower metal sheet; and a bottom flange extending laterally from said portion outwardly between a valley and said lower metal sheet; and securing means securing said profiled metal sheet to said floor unit.

2. The flooring unit as defined in claim 1 wherein said partitioning element includes:
a top flange adjacent to the crest of said first cell and residing between said crest access opening and said lengthwise trough.

3. The flooring unit as defined in claim 1 wherein said securing means secures said flange to said valley and to said lower metal sheet.

4. The flooring unit as defined in claim 1 wherein said flooring unit presents a central cell and lateral cells, one on each side of said central cell; and wherein said adjacent cells comprise a lateral cell and said central cell.

5. The flooring unit as defined in claim 4 wherein said first cell comprises said lateral cell.

6. The flooring unit as defined in claim 4 including:
a second set of access opening in other adjacent cells consisting of said central cell and the other lateral cell, including a second crest access opening in the crest of said other lateral cell, and opposed third and fourth web access openings in the confronting webs of said other lateral cell and said central cell respectively; and
a second distinct partitioning element substantially coextensive in length with said other lateral cell, dividing said other lateral cell into a third subcell including said second crest access opening and a fourth subcell including the third web access opening;
said second set of access openings being offset from the first said set of access openings longitudinally along said flooring unit.

7. An electrical wiring distributing metal cellular flooring unit comprising:
a corrugated upper metal sheet presenting alternating coplanar crests and coplanar valleys and webs connecting adjacent ones of said crests and said valleys, and a correlative lower metal sheet secured to said upper metal sheet along contiguous portions thereof, said flooring unit presenting generally parallel cells separated by a lengthwise trough, said trough comprising a valley and confronting webs connecting said valley to said coplanar crests;

a set of access openings in adjacent cells including a crest access opening in the crest of a first cell, and opposed first and second web access openings in the confronting webs of said first cell and a second cell respectively; and a distinct partitioning element substantially coextensive in length with said first cell, dividing said first cell into a first subcell including said crest access opening and a second subcell including the first web access opening, said partitioning element comprising a metal sheet extending from the crest of said first cell downwardly toward said lower metal sheet and presenting opposite faces and opposite end edges; and including a set of rib-like protrusions adjacent to each of said end edges, at least one of the protrusions of each said set projecting out of the plane of each of said opposite faces, said rib-like protrusions extending transversely of said central portion.

8. The flooring unit as defined in claim 7 wherein the protrusions of each said set comprise corrugations.

9. In an electrical wiring distributing floor structure, the combination comprising at least two metal cellular flooring units as defined in claim 7 or 8 erected in end-to-end relation and in cell-to-cell registry with the end edges of the partitioning elements of said flooring units adjacent to one another, whereby a leading end of wiring pushed through one said subcell will engage the protrusions of one said partition and be deflected thereby away from the end edge of the other partitioning element.

10. In a floor structure adapted to distribute the wiring of three electrical services, the improvement comprising:
a metal subfloor including at least one metal cellular flooring unit presenting generally parallel cells separated by a lengthwise trough, said cells presenting coplanar crests, said lengthwise trough comprising a valley and confronting inclined webs connecting said valley to said coplanar crests;
a set of access openings in adjacent cells including: a crest access opening in the crest of a first cell, and opposed first and second web access openings in the confronting inclined webs of said first cell and a second cell, respectively;
partitioning means substantially coextensive in length with said first cell, dividing said first cell into a first subcell including said crest access opening and a second subcell including the first web access opening;
housing means overlying said flooring unit and providing a chamber enclosing said crest access opening and a portion of said lengthwise trough including said first and second web access openings, said housing means having an upper wall with an outlet opening; and
an inverted generally U-shaped member extending transversely of said housing and having a top wall exposed at said outlet opening and residing at least at the level of said upper wall of said housing, and opposite sidewalls extending downwardly from said top wall toward said flooring unit, said U-shaped member dividing said chamber into a first compartment including said crest access opening, a second compartment including the second web access opening, and a central compartment including the first web access opening;

a layer of concrete overlying said metal subfloor presenting an upper surface and including a concrete opening providing access to said chamber; and outlet means capping said opening and being substantially flush with said upper surface of said concrete.

11. The floor structure as defined in claim 10 wherein said partitioning means comprises a profiled metal sheet including:

a top flange residing between said crest access opening and said lengthwise trough;

a central portion extending from said top flange downwardly toward the bottom of said first cell; and a bottom flange extending laterally away from said central portion in a direction opposite to that of said top flange; and including securing means securing said profiled metal sheet to said flooring unit.

12. The floor structure as defined in claim 10 wherein said flooring unit presents a central cell and lateral cells, one on each side of said central cell; and wherein said adjacent cells comprise a lateral cell and said central cell.

13. The floor structure as defined in claim 12 wherein said first cell comprises said lateral cell.

14. The floor structure of claim 10 including an electrical receptacle supported by said top wall and wherein said outlet means comprises:

a finishing ring disposed within said concrete opening;

a three-piece closure supported by said finishing ring and including lateral closure plates separated by a central closure plate and arranged in side-by-side abutted relation;

said central closure plate having a flange-receiving recess along each opposite side thereof, an upstanding perimeter bead with a bead upper surface, a central opening surrounded by said perimeter bead, a receptacle face plate supported within said central opening at a level below said bead upper surface, and cover means overlying said face plate and being pivotally and removably connected to said central closure plate and substantially flush with said bead upper surface; and each of said lateral closure plates having an upper face, a flange extending from one side thereof and engaged in the adjacent flange-receiving recess of the central closure plate, and releasable fastener means remote from said central closure plate and operable from said upper face, releasably securing the lateral closure plate to said finishing ring.

15. The floor structure of claim 14 including:

a positive fastener securing said face plate to said electrical receptacle and retaining said central closure plate in fixed position relative to said finishing ring.

16. The floor structure of claim 14 wherein said finishing ring includes opposed support flanges, one extending inwardly beneath each of said lateral closure plates; and each of said releasable fastener means comprising a slotted head flush with the upper surface of the lateral closure, a stem depending from said slotted head downwardly through a clearance opening in the lateral closure plate, and clip means carried by said stem, including a wing resiliently engagable beneath the adjacent one of said support flanges.

17. The floor structure of claim 10 wherein said closure means comprises:

a generally rectangular finishing ring disposed within said concrete opening and having opposite ends, opposite sides, opposite first support flanges on opposed interior edges of said sides, opposed second support flanges on opposed interior edges of said ends; and a three-piece closure overlying said finishing ring, presenting an upper surface and including:

a central closure plate spanning across said opposite sides and secured to said first support flanges;

a first lateral closure plate having opposite plate sides, a first of said plate sides underlapping said central closure plate, and a second of said plate sides overlying one of said second support flanges;

a second lateral closure plate having opposite plate sides, a first of said plate sides overlapping said central closure plate, and a second of said plate sides overlying the other of said second support flanges;

pivot means pivotally connecting said first of said plate sides of said second lateral closure plate to said central closure plate for pivotal movement about an axis parallel with said first of said plate sides; and each of said second of said plate sides including releasable fastener means operable from said upper face securing each lateral closure plate to the subjacent second support flanges.

18. A three-piece closure member for a three-service electrical outlet comprising lateral closure plates separated by a central closure plate and arranged in side-by-side relations;

said central closure plate presenting flange-receiving recesses, one along each opposite side thereof, a generally rectangular central opening, an upstanding perimeter bead surrounding said central opening and presenting a bead upper surface, a receptacle face plate supported within said central opening at a level below said bead upper surface, and cover means overlying said face plate and being pivotally and removably connected to said central closure plate and substantially flush with said bead upper surface; and each of said lateral closure plates presenting an upper face below the level of said bead upper face, opposite ends substantially flush with the corresponding opposite ends of said central closure plate, a flange extending outwardly from one side thereof and engaged in the adjacent flange-receiving recess of said central closure plate, and releasable fastener means remote from said central closure plate, operable from said upper face for releasably securing said lateral closure plate to a subjacent support.

19. A flush-with-the-surface closure for a three-service wire distributing system, comprising first and second lateral closure plates separated by a central closure plate and arranged in side-by-side relation, said lateral closure plates and said central closure plate presenting coplanar upper surfaces;

said central closure plate having opposite ends and including a generally channel-shaped upper portion having opposite end portions and a connecting portion, a ledge contiguous with said upper portion and having ledge extensions contiguous with said end portions, said ledge and said ledge extensions having a common upper surface below the level of said coplanar upper faces, a pocket formed by said ledge and contiguous interior faces of said upper portion, fastener-receiving apertures, one in each of said ledge extensions, and a recess along that edge of said connecting portion opposite said ledge;

said first lateral closure plate having opposite ends coterminating with said opposite ends of said central closure plate, and a flange on one side thereof engaged with said recess;

said second lateral closure plate having opposite ends coterminating with said opposite ends of said central closure plate, and a tongue disposed in said pocket;

connecting means pivotally connecting said tongue to said central closure plate for pivotal movement about an axis parallel with said connecting portions; and each of said lateral closure plates including releasable fastener means operable from the upper face thereof for securing the lateral closure plate to a subjacent support.

20. The closure as defined in claim 19 wherein said connecting means comprises:

said tongue having end faces, one confronting the interior face of each of said opposite end portions;

grooves, one in the interior face of each of said end portions; and axially aligned pins, one projecting from each of said end faces of said tongue into the adjacent one of said grooves.

* * * * *